US010451441B2

(12) United States Patent
Hernandez-Oliver et al.

(10) Patent No.: US 10,451,441 B2
(45) Date of Patent: Oct. 22, 2019

(54) MAGNET DEVICE FOR POSITION SENSOR, MAGNET ASSEMBLY AND SENSING SYSTEM INCLUDING THE MAGNET ASSEMBLY

(71) Applicants: TYCO ELECTRONICS (SHANGHAI) CO. LTD., Shanghai (CN); TE CONNECTIVITY CORPORATION, Berwyn, PA (US)

(72) Inventors: Salvador Hernandez-Oliver, Berwyn, PA (US); Yao Zhou, Shanghai (CN); Fei Lin, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 42 days.

(21) Appl. No.: 15/570,654

(22) PCT Filed: May 4, 2016

(86) PCT No.: PCT/IB2016/052552
§ 371 (c)(1),
(2) Date: Oct. 30, 2017

(87) PCT Pub. No.: WO2016/178165
PCT Pub. Date: Nov. 10, 2016

(65) Prior Publication Data
US 2018/0283901 A1 Oct. 4, 2018

(30) Foreign Application Priority Data
May 4, 2015 (CN) .................... 2015 2 0286270 U

(51) Int. Cl.
*G01D 5/14* (2006.01)
*H01F 7/02* (2006.01)

(52) U.S. Cl.
CPC ............... *G01D 5/145* (2013.01); *H01F 7/02* (2013.01)

(58) Field of Classification Search
CPC ..... B60W 10/00; B60W 2300/00; F16H 1/00; F16H 7/00; G01D 1/00
See application file for complete search history.

(56) References Cited

U.S. PATENT DOCUMENTS 5,831,596 A 11/1998 Marshall et al.
6,304,078 B1 * 10/2001 Jarrard .................. G01B 7/003
324/207.2
(Continued)

FOREIGN PATENT DOCUMENTS

EP 0907068 A1 4/1999

*Primary Examiner* — Huy Q Phan
*Assistant Examiner* — Temilade S Rhodes-Vivour
(74) *Attorney, Agent, or Firm* — Saxton & Stump LLC; Bruce J. Wolstoncroft

(57) ABSTRACT

Provided is a magnet device for use with a position sensor. The magnet device has a magnetizing direction and has magnetic field intensity components in the magnetizing direction. The magnet device is formed with a groove recessed in the magnetizing direction, so that the magnetic field intensity components are substantially equal in the transverse direction of the magnetizing direction. The present invention further discloses a magnet assembly including the magnet device for use with a position sensor and a sensing system including the magnet assembly, particularly a neutral position sensor. The axial measuring length of a transmission shaft is prolonged with the length of the magnet device remains unchanged to meet the requirements of different customers, and the reliability of the sensing system is improved.

15 Claims, 4 Drawing Sheets

(56) References Cited

U.S. PATENT DOCUMENTS

| | | | |
|---|---|---|---|
| 8,261,630 B2* | 9/2012 | Bak | F16H 59/0204 |
| | | | 74/473.12 |
| 8,299,424 B2* | 10/2012 | Camilli | H01J 49/24 |
| | | | 250/281 |
| 2005/0225321 A1* | 10/2005 | Kurumado | G01D 5/147 |
| | | | 324/207.21 |
| 2011/0043195 A1 | 2/2011 | Hinkel et al. | |
| 2011/0089941 A1* | 4/2011 | Sasaki | B82Y 25/00 |
| | | | 324/252 |
| 2011/0215797 A1* | 9/2011 | Steinich | G01B 7/003 |
| | | | 324/207.25 |
| 2013/0063133 A1 | 3/2013 | Iwata | |

* cited by examiner

MAGNET DEVICE FOR POSITION SENSOR, MAGNET ASSEMBLY AND SENSING SYSTEM INCLUDING THE MAGNET ASSEMBLY

TECHNICAL FIELD

The invention relates to a magnet device for a position sensor, a magnet assembly including the magnet device and a sensing system including the magnet assembly.

BACKGROUND OF THE INVENTION

With the increasing demands on fuel economy and safety of vehicles, detecting transmission neutral signals and then judging the running states of a vehicle as well as controlling corresponding assemblies based on the detected transmission neutral signals so as to reduce the energy consumption and improve the safety performance of the vehicle are increasingly concerned. A neutral position sensor is mainly used for detecting whether a motor vehicle is in neutral or at a gear, so that when the vehicle is in neutral, the state of an engine is adjusted to fulfill the purposes of energy conservation and emission reduction.

As shown in FIG. 1 and FIG. 2, a conventional position sensor sensing system includes a position sensor 40 and a magnet assembly, wherein the position sensor includes a magnetic sensing chip 41, the magnet assembly is installed on e.g. a transmission shaft 50, and the magnetic sensing chip 41 is installed at one side of the magnet assembly away from the transmission shaft 50. The magnet assembly and the transmission shaft 50 moves within a limited measuring length together, and can rotate approximately 25 degrees at each gear position. The magnet assembly includes a magnet bracket 10 and a magnet 20 arranged in the magnet bracket 10. The magnet 20 arranged in the magnet bracket 10 in the prior art generally adopts a cuboid structure. In such an arrangement, magnetic field intensity components Bz in the magnetizing direction z at two ends of the magnet along the sensing direction (the axial direction of the shift shaft) y are smaller than the magnetic field intensity components in the middle of the magnet due to the magnetic field edge effect. Consequently, the measuring length L sensed by the magnetic sensing chip 41 is relatively short (as shown in FIG. 2).

Hence, the magnet 20 should be long enough in the axial direction y of the transmission shaft to ensure that the magnetic sensing chip 41 can always detect accurate data. Such requirement results in that the magnet 20 occupies a large space and is high in manufacturing cost.

SUMMARY OF THE INVENTION

(1) Technical Problems to be Solved by the Invention

One aim of the invention is to provide a magnet device for a position sensor, so that the position sensor is reliable and accurate in detection, wherein the magnet device occupies a small space and is low in manufacturing cost.

Another aim of the invention is to provide a magnet assembly including the above-mentioned magnet device.

A further aim of the invention is to provide a sensing system including the above-mentioned magnet assembly, particularly a neutral position sensor.

(2) Technical Solutions

In order to solve the above-mentioned problems, the present invention provides a magnet device for use with a position sensor, the magnet device having a magnetizing direction and having magnetic field intensity components in the magnetizing direction, wherein the magnet device is provided with a groove recessed in the magnetizing direction, so that the magnetic field intensity components are substantially equal in the transverse direction of the magnetizing direction.

Wherein, the magnet device has a sensing direction, in which the magnetic field intensity components are substantially equal.

Wherein, the magnet device is provided with a plurality of sensing positions in the sensing direction, and wherein the magnetic field intensity components are substantially equal at the plurality of sensing positions.

Wherein, the magnet device has a sensing direction, in which the length of the groove is shorter than the length of the magnet device.

Wherein, the magnet device has a sensing direction, and wherein the groove is formed in the middle of the magnet device along the sensing direction of the magnet device.

Wherein, the groove of the magnet device has two ends in the sensing direction (y) and a bottom, and wherein the two ends of the groove of the magnet device are symmetric about the bottom of the groove of the magnet device.

Wherein, the groove of the magnet device has two ends and a bottom, and wherein the respective angles formed by each end and the bottom of the groove of the magnet device are greater than or equal to 90 degrees and less than 180 degrees.

The present invention further provides a magnet assembly for a position sensor, including a magnet bracket and the above-mentioned magnet device, wherein the magnet device is arranged in the magnet bracket.

Wherein, two ends of an upper surface of the magnet bracket in the sensing direction at least partially cover the magnet device.

Wherein, the magnet assembly further includes two magnetic field concentrating segments, which are arranged in the magnet bracket and positioned at two sides of the magnet respectively.

Wherein, the magnet bracket, the magnet device and the magnetic field concentrating segments are integrally formed by injection molding.

The present invention further provides a sensing system for a position sensor, including a position sensor and the above-mentioned magnet assembly.

Wherein, the position sensor includes a magnetic sensing chip, wherein the groove of the magnet device in the magnet assembly faces the magnetic sensing chip, and wherein the installation positions of the position sensor and the magnet assembly enable the magnetic field intensity components sensed by the magnetic sensing chip in the position sensor to be substantially equal in the transverse direction of the magnetizing direction.

Wherein, the position sensor is a neutral position sensor, wherein in use, the magnet assembly is installed on a transmission shaft, the magnetic sensing chip is installed at one side of the magnet assembly away from the transmission shaft and spaced apart from the magnet assembly, and wherein when the magnet assembly moves in the sensing direction to shift gears, the installation positions of the position sensor and the magnet assembly enable the magnetic field intensity components to be substantially equal in the sensing direction.

(3) Advantageous Effects

In the embodiments of the invention, the structure of the magnet device is improved, so that the magnet device can provide a target magnetic field of which the magnetic field intensity components Bz are substantially equal in the transverse direction of the magnetizing direction z. When the magnet device is used for the sensing system of the position sensor, the magnet device can provide a target magnetic field of which the magnetic field intensity components Bz are substantially equal in the transverse direction of the magnetizing direction z, so that the magnetic sensing chip can accurately detect the magnetic field and output a signal, and therefore, the sensitivity of the position sensor is improved. Meanwhile, the length of the magnet device in the axial direction y of the transmission shaft is reduced, so that the space taken up by the magnet device is reduced. Moreover, the device is simple in structure and easy to manufacture.

DETAILED DESCRIPTION OF THE EMBODIMENTS

The specific implementations of the invention will be further described in detail below in combination with the accompanying drawings and embodiments. The following embodiments are used for illustrating the invention, rather than limiting the scope of the invention.

Figure 3:
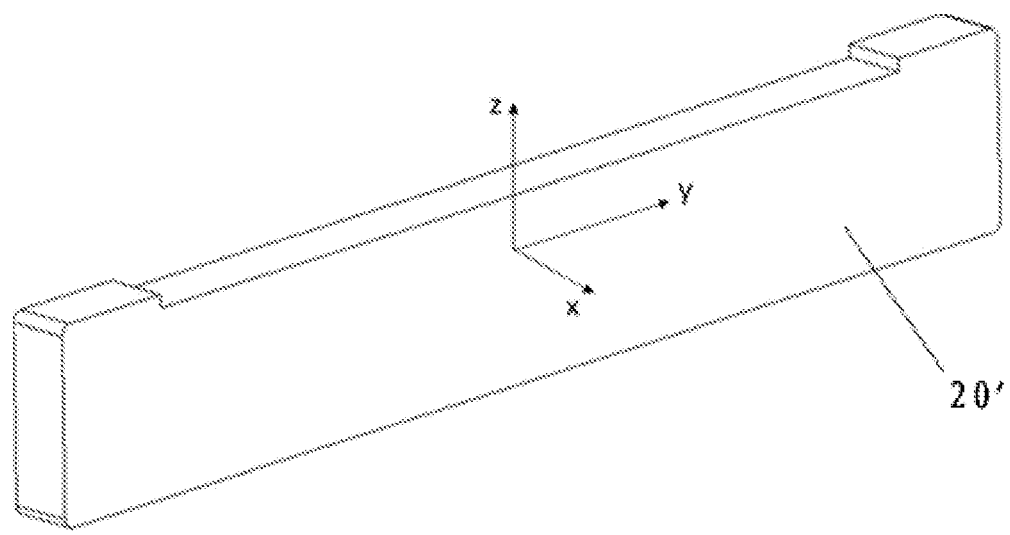
FIG. 3 is a schematic structural diagram of a magnet device according to the present invention.
Figure 4:
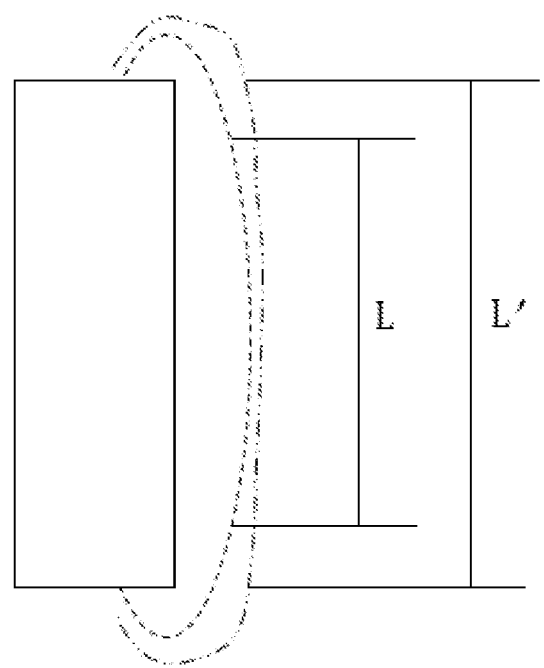
FIG. 4 is a schematic diagram showing comparison of magnetic field intensity components Bz in the magnetizing direction z and effective measuring lengths between the magnet in the prior art and the magnet device according to the present invention.

FIG. 3 shows a preferred embodiment of a magnet device 20' for a position sensor according to the present invention. The magnet device 20' has a magnetizing direction z and has magnetic field intensity components Bz in the magnetizing direction z; and the magnet device 20' is provided with a groove recessed in the magnetizing direction z, so that the magnetic field intensity components Bz are substantially equal in the transverse direction of the magnetizing direction z. Preferably, the magnet device 20' has a sensing direction y, and the magnetic field intensity components Bz are substantially equal in the sensing direction y. When the magnet device 20' is used for a position sensor, the measuring length L' of a magnetic sensing chip in the position sensor is increased (as shown in FIG. 4), so the length of the magnet device 20' in the sensing direction y is reduced under the condition that the measuring length remains unchanged. Therefore, the space occupied by the magnet device 20' is reduced, and the cost is lowered.

Figure 5:
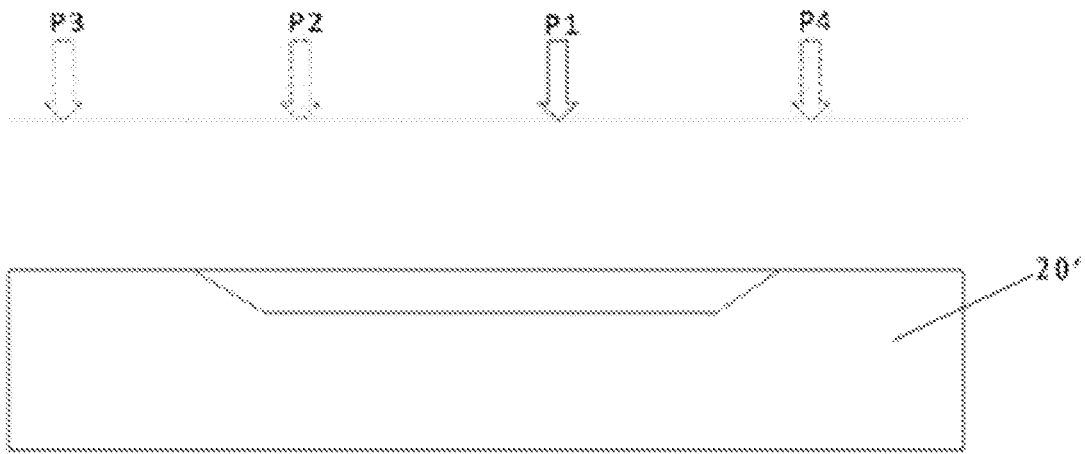
FIG. 5 shows four sensing positions of the magnet device in the sensing direction y according to the present invention.

Specifically, the magnet device 20' is provided with a plurality of sensing positions in the sensing direction y, and the magnetic field intensity components Bz are substantially equal at the plurality of sensing positions. FIG. 5 shows four sensing positions P1, P2, P3 and P4, which are the corresponding positions measured by the position sensor when a transmission shaft is at the gear 1, gear 3, gear 5 and gear R (reverse gear), respectively. However, the number of sensing positions may also be different than four, e.g., three, five, etc.

The magnet device 20' has a sensing direction y, in which the groove is shorter than the magnet device 20'.

The magnet device 20' has a sensing direction y, and the groove is formed in the middle of the magnet device 20' along the sensing direction y of the magnet device 20'.

The groove of the magnet has two ends in the sensing direction (y) and a bottom, and the two ends of the groove are symmetric about the bottom of the groove of the magnet device 20'.

Figure 6:
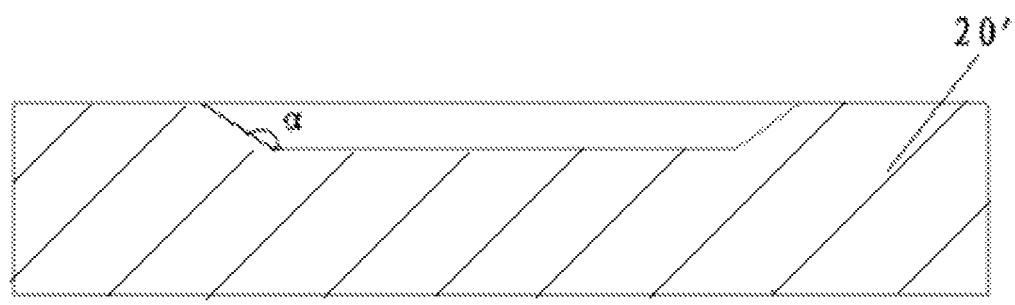
FIG. 6 is a section view of the magnet device according to the present invention.

The groove of the magnet has two ends and a bottom, and the respective angles α formed by each end and the bottom of the groove of the magnet device 20' are greater than or equal to 90 degrees and less than 180 degrees, as shown in FIG. 6.

Figure 1:
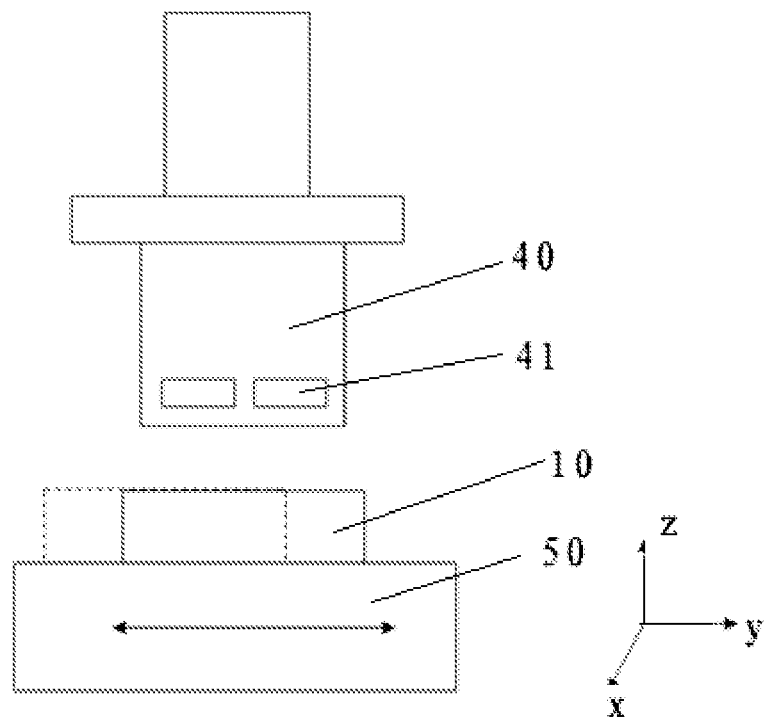
FIG. 1 illustrates a conventional sensing system having a magnet and a position sensor.
Figure 2:
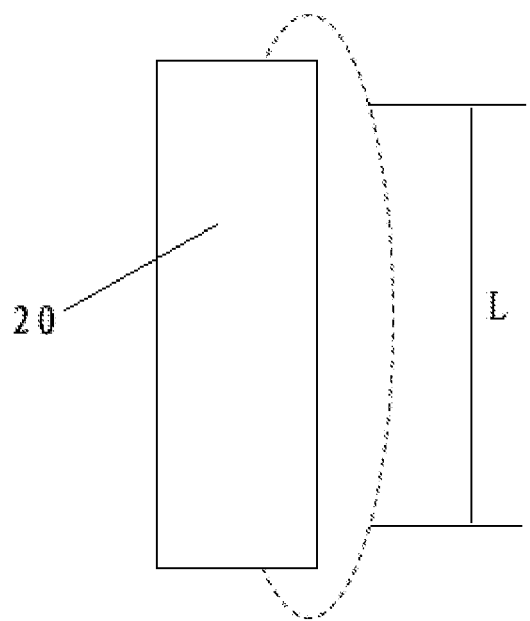
FIG. 2 shows the magnetic field intensity components Bz in the magnetizing direction z and the effective measuring length of a magnet device in FIG. 1.
Figure 7:
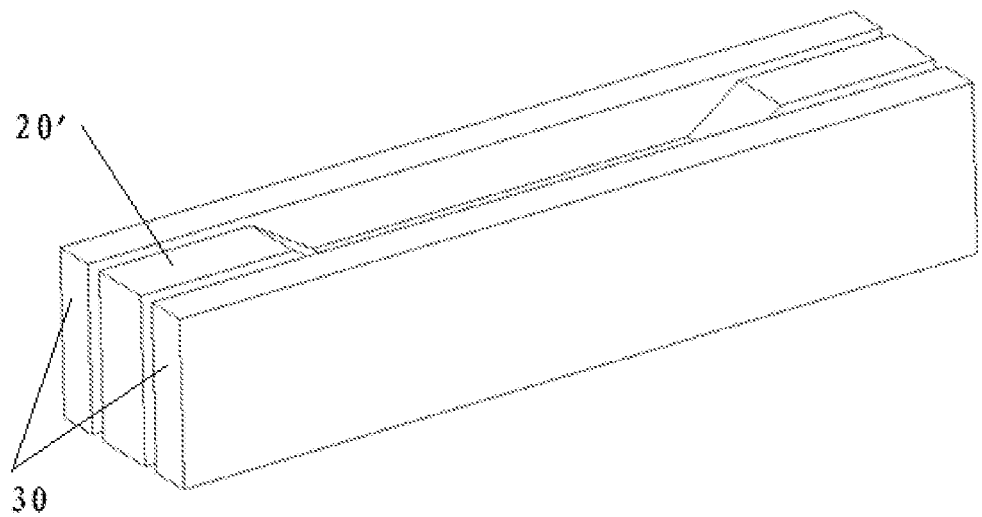
FIG. 7 is a schematic structural diagram of a magnet assembly according to the invention.

FIG. 7 shows a preferred embodiment of a magnet assembly 10 according to the present invention. The magnet assembly in this embodiment includes a magnet bracket 10 (as shown in FIG. 1) and the above-mentioned magnet device 20', wherein the magnet device 20' is fixed in the magnet bracket 10, and the groove of the magnet device 20' is upward, so that the magnet bracket 10 and the magnet device 20' form an integrated member. For example, the magnet bracket 10 may be formed by injection molding of plastic on the magnet device 20'. Preferably, two ends of an upper surface of the magnet bracket 10 in the sensing direction y at least partially cover the upper surface of the magnet device 20', so that the magnet device 20' is firmly fixed in the magnet bracket 10.

Moreover, the magnet assembly further includes two magnetic field concentrating segments 30, which are also arranged in the magnet bracket 10 and positioned at two sides of the magnet device 20', respectively (as shown in FIG. 7). Each of the magnetic field concentrating segments 30 is a thin layer of soft magnetic material and can concentrate the magnetic field, thus increasing the intensity of the magnetic field and improving the signal-to-noise ratio.

Preferably, the magnet bracket 10, the magnet device 20' and the magnetic field concentrating segments 30 are integrally formed by injection molding. It should be noted that, the magnet assembly may also be manufactured by adopting other methods.

The magnet assembly of the present invention can be used cooperatively with a position sensor 40 for position measurement. According to a preferred embodiment of the invention, the position sensor 40 may include a magnetic sensing chip 41, which judges the position of a measured object by measuring the change of the magnetic field. In addition, the groove of the magnet in the magnet assembly faces the magnetic sensing chip. After the magnet assembly and the position sensor 40 are respectively installed, the magnetic field intensity components Bz are substantially equal in the transverse direction of the magnetizing direction z.

Figure 8:
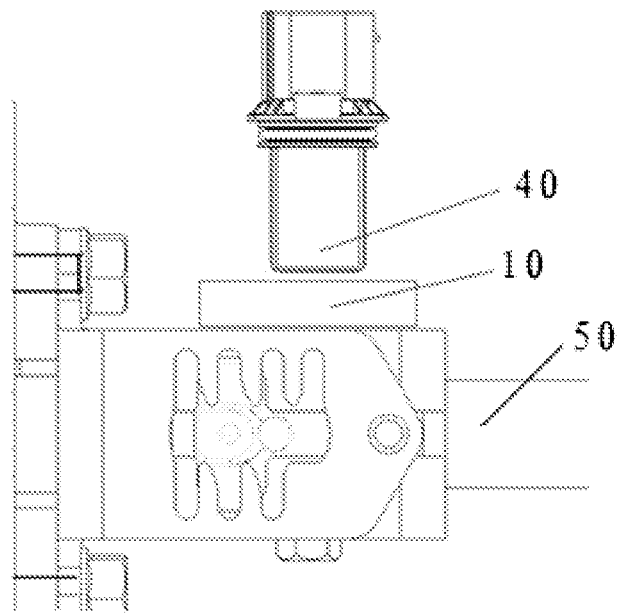
FIG. 8 is a schematic diagram of an installation structure of a neutral position sensor according to the present invention.

The invention further discloses a sensing system for a position sensor, particularly a neutral position sensor, including a position sensor 40, as shown in FIG. 8. Similar to that shown in FIG. 1, the position sensor 40 of the present invention includes a magnetic sensing chip 41, e.g., a Hall device. The sensing system further includes the above-mentioned magnet assembly.

The installation and operation of the present invention will be described in more detail below in combination with the neutral position sensor assembly. During installation, the magnet assembly is fixedly installed on a transmission shaft 50, wherein one pole of the magnet device 20' in the magnet assembly faces the transmission shaft 50, while the other pole of the magnet device 20' faces away from the transmission shaft 50. The position sensor 40 with the magnetic sensing chip 41 is installed at one side of the magnet device 20' away from the transmission shaft 50, and the magnetic sensing chip 41 is directly over the magnet device 20' installed on the transmission shaft 50. The magnetic sensing chip 41 and the position sensor 40 are spaced apart from the magnet device 20'.

When the transmission shaft 50 performs a gear shifting operation under the control of a gear shift lever, the magnet device 20' installed on the transmission shaft 50 moves relative to the neutral position sensor 40. The magnetic sensing chip 41 in the neutral position sensor 40 senses the gear, and transmits the sensing results to a controller for signal processing, in order to judging the gear position of the transmission shaft 50. When the transmission shaft 50 moves axially (that is, along the sensing direction y) around its axis to shift gears, the groove of the magnet enables the magnetic field intensity components Bz to be substantially equal in the sensing direction y, so that the magnetic sensing chip 41 can accurately detect the magnetic field and detection errors caused by the edge effect of the magnetic field are prevented. Therefore, the reliability of the neutral position sensor 40 is greatly improved.

Preferably, the magnet device 20' is a permanent magnet. The material of the permanent magnet device 20' including neodymium iron boron, samarium cobalt or nickel cobalt.

Moreover, in order to further ensure the detection accuracy, the number of the magnetic sensing chip 41 is preferably two.

The foregoing descriptions are merely preferred embodiments of the present invention. It should be pointed out that, many improvements and variations may also be made by those of ordinary skill in the art without departing from the principle of the present invention, and these improvements and variations should be regarded as falling within the protection scope of the invention.

The invention claimed is:

1. A magnet device for use with a position sensor, the magnet device having a magnetic field, a magnetizing direction (z) and magnetic field intensity components (Bz) in the magnetizing direction (z),
   wherein the magnet device is formed with a groove recessed extending along the length of the magnet device and in the magnetizing direction (z), so that the magnetic field intensity components (Bz) are substantially equal in a transverse direction along the length of the magnet device of the magnetizing direction (z);
   wherein errors caused by edge effects of the magnetic field are prevented.

2. The magnet device of claim 1, wherein the magnet device has a sensing direction (y) in which the magnetic field intensity components (Bz) are substantially equal.

3. The magnet device of claim 1, wherein the magnet device has a plurality of sensing positions in the sensing direction (y), and wherein the magnetic field intensity components (Bz) are substantially equal at the plurality of sensing positions.

4. The magnet device of claim 1, wherein the magnet device has a sensing direction (y) in which the length of the groove is shorter than the length of the magnet device.

5. The magnet device of claim 1, wherein the magnet device has a sensing direction (y), and wherein the groove is formed in a middle portion of the magnet device along the sensing direction (y) of the magnet device.

6. The magnet device of claim 1, wherein the groove of the magnet device has two ends in the sensing direction (y) and a bottom, and wherein the two ends of the groove of the magnet device are symmetric about the bottom of the groove of the magnet device.

7. The magnet device of claim 1, wherein the groove of the magnet device has two ends and a bottom and wherein the respective angles formed by each end and the bottom of the groove are greater than or equal to 90 degrees and less than 180 degrees.

8. A magnet assembly for a position sensor, the magnet assembly comprising a magnet bracket and the magnet device claim 1, wherein the magnet device is supported in the magnet bracket.

9. The magnet assembly of claim 8, wherein two ends of an upper surface of the magnet bracket in the sensing direction (y) at least partially cover the magnet device.

10. The magnet assembly of claim 8, further comprising two magnetic field concentrating segments arranged in the magnet bracket and positioned at two sides of the magnet device respectively.

11. The magnet assembly of claim 8, wherein the magnet bracket, the magnet device and the magnetic field concentrating segments are integrally formed by injection molding.

12. A sensing system for a position sensor, comprising a position sensor and the magnet assembly of claim 8.

13. The sensing system of claim 12, wherein the position sensor comprises a magnetic sensing chip, wherein the groove of the magnet device faces the magnetic sensing chip, and wherein the position sensor and the magnet assembly are arranged to enable the magnetic field intensity components (Hz) sensed by the magnetic sensing chip in the position sensor to be substantially equal in the transverse direction of the magnetizing direction (z).

14. The sensing system of claim 12, wherein the position sensor is a neutral position sensor.

15. The sensing system of claim 14, wherein in use, the magnet assembly is adapted to be installed on a transmission shaft, while the magnetic sensing chip is installed at one side of the magnet assembly away from the transmission shaft and spaced apart from the magnet assembly, and wherein when the magnet assembly moves in the sensing direction (y) to shift gears, the installation positions of the position sensor and the magnet assembly enable the magnetic field intensity components (Bz) to be substantially equal in the sensing direction (y).

* * * * *